United States Patent [19]

Cooper

[11] 3,850,400
[45] Nov. 26, 1974

[54] DEVICE FOR HOLDING A STUB END A SPINDLE

[75] Inventor: Ronald Charles Cooper, Ilford, England

[73] Assignee: Ilford Limited, Ilford, Essex, England

[22] Filed: May 22, 1973

[21] Appl. No.: 362,938

[30] Foreign Application Priority Data
May 26, 1972 Great Britain ............... 24945/72

[52] U.S. Cl. ................ 248/251, 64/5, 193/35 R
[51] Int. Cl. ........................................... B65g 13/11
[58] Field of Search ........... 248/251; 64/5; 308/20; 24/241 PL, 157 P, 156 P; 193/35 R, 35 C

[56] References Cited
UNITED STATES PATENTS

| | | | |
|---|---|---|---|
| 1,737,382 | 11/1929 | Morehouse | 24/157 P |
| 2,142,877 | 1/1939 | Wells | 24/157 P |
| 2,391,272 | 12/1945 | Rose | 193/35 R |
| 2,531,770 | 11/1950 | Ducharme | 193/35 C X |
| 2,593,089 | 4/1952 | Barry | 193/35 R |
| 2,696,283 | 12/1954 | Barry | 193/35 R |
| 3,540,561 | 11/1970 | Becker | 193/35 R |
| 3,721,326 | 3/1973 | Bussienne | 193/35 R |

*Primary Examiner*—J. Franklin Foss
*Attorney, Agent, or Firm*—Wenderoth, Lind & Ponack

[57] ABSTRACT

A device adapted for imprisoning a stub end of a spindle-type element comprises a drum having a drum slot which is open at the periphery of the drum on at least one face thereof, a locking ring having a central opening into which said drum fits in coaxial alignment, which ring is provided with an axially aligned ring slot which is open from the external surface of said ring to the inner surface thereof and which extends only part way from one annular frontal face of said ring through an annular portion of the axial thickness of said ring; and which ring is rotatable about the common axis of said drum and said ring, from a position in which said drum slot and said ring slot are in register to a position wherein said two slots are angularly displaced relative to each other, and has at least one cam recess extending on the inner surface of said annular portion and being of maximum depth at said ring slot, and gradually merging with the inner wall of said central ring; and biasing means provided in engagement with said drum and with said ring and tending to angularly displace said drum and ring relative to one another about said common axis to move said drum slot out of register with said ring slot and into facing said cam recess of said ring and toward where said recess merges with said inner wall of said central ring opening.

5 Claims, 9 Drawing Figures

PATENTED NOV 26 1974    3,850,400

DEVICE FOR HOLDING A STUB END A SPINDLE

This invention relates to a device for imprisoning a stub end of a spindle-type element in mechanical apparatus.

Such devices are known to be useful in many ways, for instance in the mounting of the shafts of the rollers in a conveyor belt, or of a reel of film in a photographic camera. The known devices often comprise a drum and a locking ring surrounding the same. However, there is often the drawback that such devices have a tendency to open and allow the stub end of the spindle or shaft to come out of the device when the apparatus which comprises the device is in operation. In order to prevent this from happening, rather complicated locking means have been incorporated in the known devices.

It is, therefore, a main object of the invention to provide a device for imprisoning a stub end of a spindle-type element, e.g., of a spindle or shaft, which device is safe against unintentional opening or against being left open unintentionally; it is a further object of the invention to provide such a device which is of particularly simple construction and easy to manufacture and to handle, when inserting and locking the stub end of the spindle-type element therein, or, on the other hand, when taking the latter out of the device.

According to the present invention therefore there is provided a device adapted for imprisoning a stub end of a spindle-type element and comprising a drum having a drum slot which is open at the periphery of the drum on at least one face thereof; a locking ring having a central opening into which said drum fits in coaxial alignment, which ring is provided with an axially aligned ring slot which is open from the external surface of said ring to the inner surface thereof and which extends only part way from one annular frontal face of said ring through an annular portion of the axial thickness of said ring; and which ring is rotatable about the common axis of said drum and said ring, from a position in which said drum slot and said ring slot are in register to a position wherein said two slots are angularly displaced relative to each other, and has at least one cam recess extending on the inner surface of said annular portion and being of maximum depth at said ring slot, and gradually merging with the inner wall of said central ring; and biassing means provided in engagement with said drum and with said ring and tending to angularly displace said drum and ring relative to one another about said common axis to move said ring slot out of register with said drum slot and into facing said cam recess of said ring and toward where said recess merges with said inner wall of said central ring opening.

In the combination of a stub end of a spindle and a device for imprisoning the said stub end, according to the invention, the axially aligned drum slot which is open at the periphery of the drum on at least one face thereof, accomodates the stub end of the spindle so that the stub end of the spindle rests in the slot with its surface protruding slightly from out of the slot, and the said drum comprises means for fixing the drum rigidly in position. The internal surface configuration of the locking ring is such in relation to the stub end and to the drum that the ring is rotatable about the common axis of the drum and the ring from a position in which the drum slot and the ring slot are in register to a position in which the internal surface of the ring and the protruding surface of the stub end bind together with a wedging action, in which position a portion of the periphery of the ring covers the stub end, the rotation of the ring being effected by the biassing means in the manner described hereinbefore.

The provision of the biassing means which tends to return the locking ring to the out-of-register or closed position prevents the locking ring of the device from being left open accidentally thus allowing the stub end of the spindle to come out of the device when an apparatus which comprises the device is in operation. Thus when the locking ring has been rotated in order to insert the stub end of a spindle the locking ring returns to the out-of-register position locking the stub end of the spindle in the device.

Preferably the thickness of the locking ring, measured at right angles to the common axis of the drum and the ring and measured from the slot in the locking ring, increases from a minimum on at least one side of the said slot in the locking ring to a maximum thickness which is between an eighth and a third of the circumferential distance around the locking ring away from the ring slot.

Preferably there is provided on the internal periphery of the locking ring an abutment member which serves as a stop to the extent of rotation of the ring. When the drum is present inside the locking ring with the two slots in register this abutment member moves in a peripheral groove in the drum and abuts against one end of the groove. When the locking ring is rotated the abutment member moves in the groove until it abuts against the other end of the groove. This prevents the locking ring from being rotated to any greater extent. The circumferential length of the groove is such that when the locking ring is rotated, the abutment member abuts the end of the groove at the same time as the locking ring is locked around the drum due to the wedging action between the internal surface configuration of the ring and the top of the stub end. The presence of the abutment member and groove prevents the locking ring from becoming jammed on to the drum.

Preferably the configuration of the groove in the drum and the abutment on the locking ring is such that when the abutment member moves in the groove the surface of the abutment member and the groove bind together with a wedging action. This aids in locking the locking ring on to the stub end of the imprisoned spindle.

The preferred method of providing a biassing means which tends to return the locking ring to the out-of-register position is to provide a resilient means, such as a coiled spring in the peripheral groove. Thus when the locking ring is rotated to allow a stub end of a spindle to be inserted or removed from the device the spring is compressed and thus tends to return the locking ring to the out-of-register position.

However other biassing means such as external spring means may be used which tend to return the locking ring to the out-of-register position.

The device may be made from any material such as plastics, wood or metal and the locking ring may be of the same of different material from the drum. Preferably both locking ring and drum are made of a plastics material and each is moulded in one piece. Preferred plastics materials are thermoplastic acetateresins from anhydrous formaldehyde (e.g., Delrin 500 and 150), glass fibre-reinforced nylon, and polypropylene.

If the device of the present invention is fabricated of a plastics material it may be desirable to earth the imprisoned spindle, by means of a metal band which fits in the slot in the drum and is bent over the end of the slot to make contact with the mount to which the device is fitted, or by means of a metal securing strip which touches the spindle when in position and through which bolts secure the device to the mounting.

The accompanying drawings will serve to illustrate the invention.

Figure 1:
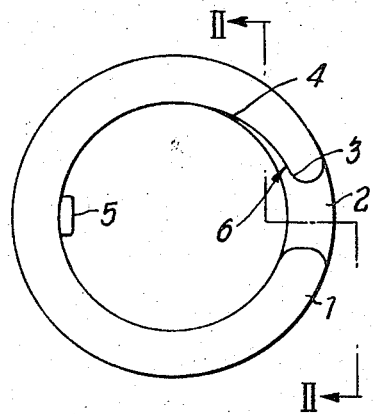
FIG. 1 is a top plan view of a locking ring.
Figure 2:
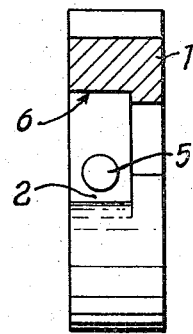
FIG. 2 is a side elevation of the locking ring partially in section along a plane designated by II-II in FIG. 1.

In FIG. 1 a locking ring 1 which has been molded in one piece from Delrin has a slot 2 which extends part of the way through the axial thickness of the ring. This is shown more clearly in FIG. 2. The thickness of the ring (measured at right angles to the common axis of the drum and the ring) is at its thinnest at point 3 and the thickness gradually increases until it is at a maximum at point 4, thus forming a cam recess 6 having a curved cross-sectional contour line. Point 4 is approximately an eighth of the circumference of the ring 1 from point 3. The thickness of the remainder of ring 1 is the same as at point 4. Also present on the inner periphery of the ring is an abutment member 5 which is located at the back of ring 1.

Figure 3:
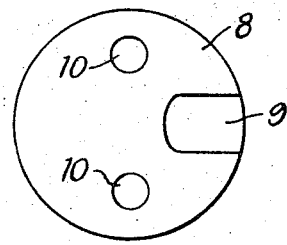
FIG. 3 is a top plan view of a drum.

In FIG. 3 a drum 8 has a slot 9 which has been shaped to accommodate the stub end of a spindle. Also present in the drum are two holes 10 which may be used to fasten the drum to a support.

Figure 4:
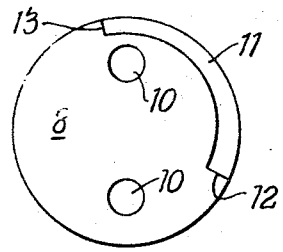
FIG. 4 is a bottom plan view of the same drum.

In FIG. 4 the reverse side of the drum 8 is shown. There is present on the reverse of the drum 8 a groove 11, the width and/or depth of the groove being greatest at end 12 and least at end 13.

Figure 5:
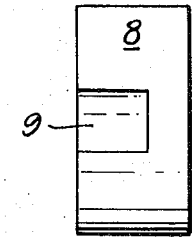
FIG. 5 is a side elevation of the drum.

In FIG. 5 the drum slot 9 is shown as extending only part way through the drum 8.

In the remaining Figures the same numbers designate the same features as in the previous Figures.

Figure 6:
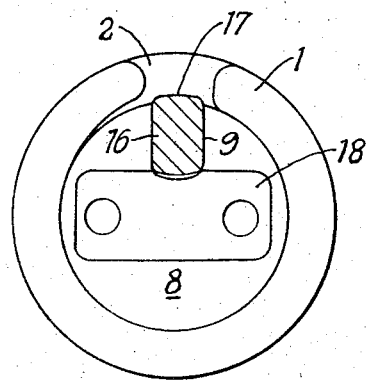
FIG. 6 is a top plan view of the device and a spindle.

In FIG. 6 the drum 8 is shown fitted into the locking ring 1. The two slots 2 and 9 are shown in register to allow the stub end of a spindle to be removed from the drum slot 9. The top surface 18 of the stub end 16 is shown as protruding slightly out of the drum slot 9.

Also shown in FIG. 6 is a metal securing plate 18 which has two holes which register with the holes 10 on the drum 8. Bolts are inserted through these holes and there hold the device secure on its mounting and also serve to earth the device through electrical contact with the plate 18 and the spindle 16.

Figure 7:
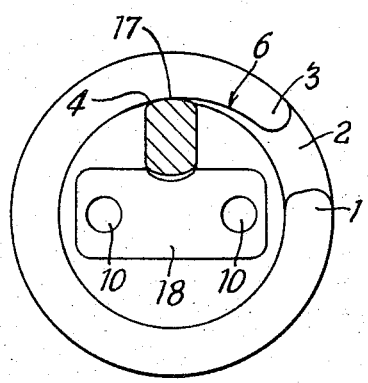
FIG. 7 is the same view of the device and spindle, the locking ring having been partially rotated.

In FIG. 7 the combination is shown in operating state. The locking ring 1 has been rotated through an arc towards the right by the biassing means shown in FIG. 8. The locking ring has been able to slide over the top surface 17 of the stub end due to the comparative thinness of the ring at point 3. As the ring is rotated the thickness of the ring over the top surface 17 of the stub end 16 increases until the locking ring 1 locks over the top surface 17 of the stub end 16 due to a wedging action.

Figure 8:
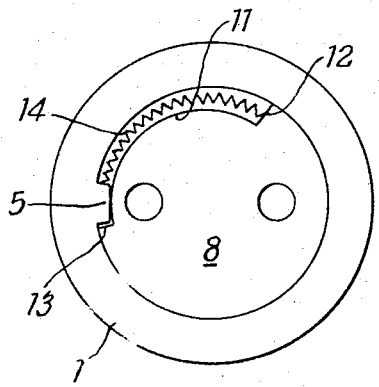
FIG. 8 is the bottom plan view of the device in the same condition as in FIG. 5.

In FIG. 8 is shown the position on the reverse side of the drum and locking ring in the same position as the position shown in FIG. 7. In this figure the abutment member 5 is shown abutting the end 13 of the groove 11. Due to the shape of the groove 11 the abutment member 5 is wedged into the groove. The locking ring 1 can be rotated no further towards the left (in this figure) because the abutment member 5 abuts the end of the groove. (If the drum 8 and the locking ring 1 were in the position shown in FIG. 6 the abutment member 5 would have abutted the end 12 of groove 11).

There is present in the groove 11 a compressible spring, preferably a length of coil spring 14. This coil spring 14 urges the abutment member 5 into abutment with the end of the groove 13. When the locking ring 2 is rotated to allow the stub end of the spindle 16 to be placed in the drum slot or removed therefrom the spring 14 tends to return the locking ring to the position shown in FIG. 7. Thus the presence of the coil spring 14 prevents the device being used in such condition that a stub end of a spindle present in the drum slot 9 could accidentally come out of this slot and out of ring slot 2.

The combination of a stub end of the spindle and a device for imprisoning the stub end of the spindle is of particular use when the spindle is a roller spindle, the roller being part of a conveyor system or the like. A plan view of such a system is shown in FIG. 9.

Figure 9:
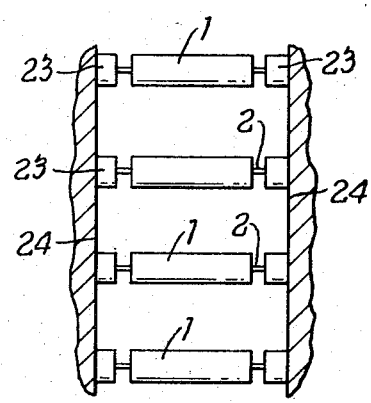
FIG. 9 is a top plan view of a conveyor system which incorporates the device according to the invention.

In FIG. 9 the conveyor system comprises a number of rotatable rollers 21, each of which is mounted on a spindle 22. Each stub end of the spindles 22 is imprisoned in a device 23 of the type hereinbefore described which comprises a drum inside a locking ring. The drums are each secured to a side suppoert 24. To place the rollers in position the slots in the drum and locking ring of each device are brought into register by rotation of the locking ring. The stub ends of each spindle are then lowered so that they are accommodated in the slot in the drum. The locking rings are then allowed to return to the locking position under the biassing action of the coiled spring until they are locked in position due to the wedging action between their internal surface and the top surface of the stub end. At this point as is shown in FIG. 7 a portion of the periphery of the ring covers the stub end.

In use it has been found that the locking rings will not move and thus the stub ends of the spindles are securely imprisoned in the device.

The device adapted for imprisoning a stub end according to the invention, can be used in the combination with any appropriate size stub end of a spindle.

What is claimed is:

1. A device adapted for imprisoning a stub end of a spindle-type element and comprising a drum having a drum slot which is open at the periphery of the drum on at least one face thereof, a locking ring having a central opening into which said drum fits in coaxial alignment, which ring is provided with an axially aligned ring slot which is open from the external surface of said ring to the inner surface thereof and which extends only part way from one annular frontal face of said ring through an annular portion of the axial thickness of said ring; and which ring is rotatable about the common axis of said drum and said ring, from a position in which said drum slot and said ring slot are in register to a position wherein said two slots are angularly displaced relative to each other, and has at least one cam recess extending on the inner surface of said annular portion and being of maximum depth at said ring slot, and gradually merging with the inner wall of said central ring; and biassing means provided in engagement with said drum and with said ring and tending to angularly displace said drum and ring relative to one another about said common axis to move said drum slot out of register with said ring slot and into facing said cam recess of said ring and toward where said recess merges with said inner wall of said central ring opening.

2. A device as described in claim 1, wherein said biassing means comprise a compressible spring.

3. A device as described in claim 2, wherein said drum has a groove extending about part of the periphery thereof substantially at a right angle to the drum axis and said ring bears an abutment member protruding from the inner wall of said central ring opening into said groove, said spring being located in said groove and urging said abutment member toward one end of said groove.

4. A device as described in claim 1, wherein the thickness of the locking ring, measured at right angles to the common axis of the drum and the ring, and measured from said ring slot increases from a minimum on at least one side of the said slot to a maximum thickness which is between an eighth and a third of the circumferential distance around the locking ring away from said ring slot.

5. A device as described in claim 3, wherein the configuration of said groove and of said abutment member are such that when said abutment member moves in said groove under the action of said spring the surface of said abutment member and the surface of said groove bind together with a wedging action.

* * * * *